United States Patent [19]
Nakakita et al.

[11] Patent Number: 6,161,518
[45] Date of Patent: Dec. 19, 2000

[54] DIRECT-INJECTION DIESEL ENGINE AND COMBUSTION METHOD FOR THE SAME

[75] Inventors: Kiyomi Nakakita; Minaji Inayoshi; Kazuhisa Inagaki; Yoshihiro Hotta; Takayuki Fuyuto, all of Aichi-ken, Japan

[73] Assignee: Kabushiki Kaisha Toyota Chuo Kenkyusho, Aichi-gun, Japan

[21] Appl. No.: 09/276,732

[22] Filed: Mar. 26, 1999

[30] Foreign Application Priority Data

Mar. 27, 1998 [JP] Japan .................................. 10-100274
Mar. 5, 1999 [JP] Japan .................................. 11-058032

[51] Int. Cl.$^7$ ....................................................... F02F 3/26
[52] U.S. Cl. ........................... 123/298; 123/276; 123/279
[58] Field of Search ..................... 123/298, 276, 123/279, 261, 285

[56] References Cited

U.S. PATENT DOCUMENTS

| | | | |
|---|---|---|---|
| 4,311,122 | 1/1982 | Banba et al. ............................. | 123/279 |
| 4,635,597 | 1/1987 | Ohashi et al. ........................... | 123/276 |
| 4,793,305 | 12/1988 | Joyce ....................................... | 123/279 |
| 4,838,222 | 6/1989 | Yanagisawa et al. ................... | 123/263 |
| 4,953,528 | 9/1990 | Oikawa et al. .......................... | 123/276 |
| 5,007,394 | 4/1991 | Brychta et al. .......................... | 123/279 |
| 5,029,563 | 7/1991 | Hu ............................................ | 123/262 |
| 5,099,809 | 3/1992 | Kawatani et al. ....................... | 123/276 |
| 5,357,924 | 10/1994 | Onishi ...................................... | 123/276 |

FOREIGN PATENT DOCUMENTS 7-293250 11/1995 Japan .
8-296442 11/1996 Japan .

OTHER PUBLICATIONS

Patent Abstracts of Japan, vol. 12, No. 424 (M–761), Nov. 10, 1998, JP 63 159616, Jul. 2, 1988.
Patent Abstracts of Japan, vol. 12, No. 346 (M–742), Sep. 16, 1998, JP 63 105227, May 10, 1988.
Patent Abstracts of Japan, vol. 15, No. 485 (M–1188), Dec. 9, 1991, JP 03 210021, Sep. 13, 1991.

*Primary Examiner*—Henry C. Yuen
*Assistant Examiner*—Hieu T. Vo
*Attorney, Agent, or Firm*—Oblon, Spivak, McClelland, Maier & Neustadt, P.C.

[57] ABSTRACT

A direct-injection diesel engine in which a shallow-dish type piston cavity is formed on a top surface of a piston; wherein in the vicinity of the top dead center, a squish area is defined mainly by the top surface of the piston and an inner surface of a cylinder head opposite the top surface; when a velocity of a reverse squish flow from the shallow-dish type piston cavity to the squish area, generated due to a movement of the piston and is represented by Vs, and a fuel spray velocity in the vicinity of a lip portion of the shallow-dish type piston cavity is represented by Vsp, the distance between opposite wall portions of the shallow-dish type piston cavity is set such that the ratio Vs/Vsp is not greater than 1.25; and the squish area constitutes a part of the combustion chamber.

12 Claims, 5 Drawing Sheets

DIRECT-INJECTION DIESEL ENGINE AND COMBUSTION METHOD FOR THE SAME

BACKGROUND OF THE INVENTION

1. Field of the Invention

The present invention relates to a direct-injection diesel engine in which a shallow-dish type piston cavity is formed on the top surface of a piston, and fuel is injected from a fuel injector and burned in a fuel-air mixture state. More specifically, the present invention relates to a direct-injection diesel engine in which the distance between opposite wall portions of the shallow-dish type piston cavity is set to a predetermined value; a squish area defined by the top surface of the piston and a cylinder head forms a part of the combustion chamber as a whole; and in the vicinity of the top dead center, the velocity of a reverse squish flow from the shallow-dish type piston cavity to the squish area, generated by a movement of the piston and represented by Vs, and the fuel spray velocity in the vicinity of a lip portion of an open wall portion of the shallow-dish type piston cavity, represented by Vsp, are set such that the ratio Vs/Vsp is not greater than 1.25, so as to attain proper balance between the fuel-spray and the velocity of the reverse squish flow in order to cause the fuel to uniformly disperse within the shallow-dish type piston cavity and the squish area and to burn uniformly, to thereby reduce exhaust emission of toxic substances. The present invention also relates to a combustion method for the diesel engine.

2. Description of the Related Art

In a conventional diesel engine, combustion is mostly performed within a piston cavity and combustion in a squish area is avoided.

Recently, society has demanded the reduction of toxic exhaust emissions from small direct-injection diesel engines for automobiles. An effective measure for meeting such demand is to decrease the diameter of the nozzle hole of a fuel injector to thereby promote atomization of injected fuel. Therefore, the nozzle hole diameter has tended to decrease.

Meanwhile, from the viewpoint of reducing emission of $CO_2$, which contributes to the greenhouse effect, output power per unit displacement (specific output) is preferably increased as compared to the case of conventional engines in order to enable a smaller engine to output power comparable to that of a relatively larger conventional engine, which leads to the benefit that such a smaller engine decreases the weight of a vehicle and improves fuel efficiency. For this purpose, a turbocharger or the like is desirably employed for performing supercharging, to thereby force a greater amount of air into a cylinder, and the engine is desirably operated at high speed, as is the case with a gasoline engine.

That is, in order to reduce emission of toxic substances, demands have been placed on conventional diesel engines to realize a reduced nozzle hole diameter, an increased degree of supercharging, and an increased engine speed.

In a large-sized diesel engine for marine use or stationary use, since the engine speed is low, there is provided sufficient time for achieving complete combustion. In addition, the distance from an injection nozzle to a wall surface is long, and therefore fuel spray combusts without impinging on the wall surface. Therefore, the characteristics of combustion essentially differ from those found in a small-sized diesel engine for automobiles.

The conventional concept employed in the design of a small-sized direct-injection diesel engine for passengercars and commercial vehicles is as follows: within a period when a piston remains in the vicinity of top dead center or when the ratio of the volume of a squish area to the volume of the whole combustion chamber is small, combustion of fuel is completed within the piston cavity while the fuel is prevented from flowing out into the squish area. The diameter of the combustion chamber suitable for such combustion has been set to a relatively small value, i.e., the ratio of the outermost diameter of the piston cavity to the piston diameter has been set to 0.52 or less.

When the above-described conventional diesel engine is designed to achieve a reduced nozzle hole diameter, an increased degree of supercharging, and an increased engine speed, which will be demanded in the future, fuel cannot be burned uniformly within the piston cavity. That is, even though the velocity of fuel spray decreases due to the reduced nozzle hole diameter and the increased degree of supercharging, a reverse squish flow velocity increases due to the increased operation speed, so that the fuel spray velocity and the reverse squish flow velocity fall out of balance. Consequently, fuel vapor stagnates locally in a region extending from the upper portion of the combustion chamber to the squish area, and a nonuniform spatial distribution of fuel is thus produced, resulting in increased emission of toxic substances.

That is, among the above-described reduced nozzle hole diameter, increased degree of supercharging, and increased engine speed, the reduced nozzle hole diameter and the increased degree of supercharging (i.e., increased air density at the time of fuel injection) decrease the fuel spray velocity, whereas the increased engine speed increases the velocity of air flow; i.e., the reverse squish flow velocity. As a result, in a combustion chamber according to the conventional combustion concept, the balance between the fuel spray velocity and the air velocity is upset, so that the fuel spray velocity becomes excessively low in relation to the air flow velocity, and fuel is present locally in the region extending from the upper portion of the piston cavity to the squish area. In this case, air in the lower portion of the piston cavity cannot be used. This uneven spatial distribution of fuel prevents reduction in emission of toxic substances.

Further, the three above-described trends themselves have caused conflict with the conventional combustion concept. That is, the decreased nozzle-hole diameter decreases injection quantity per unit time, so that the injection duration tends to increase. Also, the increased degree of supercharging increases the fuel injection quantity by an amount corresponding to an increase in air intake caused by the supercharging, so that the injection duration increases. Moreover, the increased engine speed results in an increased crank angle per unit time, so that the crank-angle based fuel-injection duration increases. When an attempt is made to simultaneously satisfy the above-described requirements, the crank-angle based fuel-injection duration becomes as large as 40°.

If the fuel injection period becomes as long as above, the piston has moved to a considerably downward position when fuel injection is completed. In this case, it becomes impossible to conform to the conventional concept that combustion of fuel is completed within a piston cavity while the fuel is prevented from flowing out into the squish area. Accordingly, in the conventional concept, a combustion chamber that satisfies the three above-described requirements cannot be realized.

SUMMARY OF THE INVENTION

It is a general object of the present invention to provide a direct-injection diesel engine which attains proper balance between the velocity of the fuel spray and the velocity of the reverse squish flow, in order to cause the fuel to uniformly disperse within the shallow-dish type piston cavity and the squish area and to combust uniformly, to thereby decrease emission of toxic substances.

It is a more specific object of the present invention to provide a direct-injection diesel engine wherein a distance between opposite wall portions of a shallow-dish type piston cavity is set to a predetermined value; a squish area forms a part of the combustion chamber; and in the vicinity of a top dead center, a velocity of a reverse squish flow from the shallow-dish type piston cavity to the squish area, generated by a movement of a piston and represented by Vs, and a fuel spray velocity in the vicinity of a lip portion of the shallow-dish type piston cavity, represented by Vsp, are set such that the ratio Vs/Vsp is not greater than 1.25.

It is another object of the present invention to provide a direct-injection diesel engine which comprises a piston, a cylinder head, and a cylinder liner, and in which a shallow-dish type piston cavity is formed on the top surface of the piston, and fuel is injected from a fuel injector into the shallow-dish type piston cavity and is combusted in a fuel-air mixture state.

It is still another object of the present invention to provide a direct-injection diesel engine comprising: a combustion chamber defined by a piston, a cylinder head, and a cylinder liner; a shallow-dish type piston cavity formed on a top surface of the piston; a squish area defined by the top surface of the piston and the cylinder head in the vicinity of a compression top dead center; a fuel injector for injecting fuel into the combustion chamber to combust in a fuel-air mixture state; wherein: a distance between opposite wall surfaces of the shallow-dish type piston cavity is set such that a ratio Vs/Vsp is not greater than 1.25; and the squish area constitutes a part of the combustion chamber; where: Vs is a velocity of a reverse squish flow flowing from the shallow-dish type piston cavity to the squish area due to a movement of the piston; and Vsp is a fuel spray velocity in the vicinity of a lip portion of the shallow-dish type piston cavity.

Here, the lip portion means a minimum diameter portion at the piston cavity inlet. Also, formation of a combustion chamber partially by use of a squish area can be applied to an engine having a flat-type cylinder head, an engine having a pent-roof-type cylinder head, or the like.

Conventionally, it has been considered that combustion in diesel engines must occur within only the piston cavity and that combustion outside the piston cavity (in a squish area) must be avoided, because combustion outside the combustion chamber increases emission of toxic substances such as smoke and HC. In order to realize such a combustion concept, small-sized diesel engines have utilized a combustion chamber in which the diameter is small; i.e., the ratio of the outermost diameter of the piston cavity to that of the piston diameter is 0.52 or less.

Meanwhile, large-sized diesel engines for marine use, for stationary use, or for large trucks have a shallow-dish type piston cavity of relatively large diameter, because combustion in the large-sized diesel engines differs from that in the above-described small-sized diesel engines. That is, since the engine speed is low, there is provided sufficient time for complete combustion; and since the distance from an injection nozzle to a wall surface is long, fuel combusts without impinging on the wall surface.

However, through studies, the present inventors found that when an attempt is made to simultaneously achieve the three above-described requirements; i.e., reduction in nozzle hole diameter, increase in the degree of supercharging, and increase in engine speed, uniform combustion of fuel within a cylinder becomes impossible, if the piston combustion chamber is designed in accordance with the conventional combustion concept, thus making it difficult to reduce emission of toxic substances.

A cause of the above difficulty is that the reduced nozzle hole diameter and the increased degree of supercharging decrease the fuel spray velocity, whereas the increased engine speed increases the velocity of air flow; i.e., the reverse squish flow velocity. As a result, in a combustion chamber according to the conventional combustion concept, the balance between the fuel spray velocity and the air velocity is upset, so that fuel is present locally in the upper portion of the combustion chamber (piston cavity) and the squish area, and a nonuniform spatial distribution of fuel is produced.

Subsequently, the present inventors studied a method of realizing uniform distribution of fuel within a cylinder, while focussing attention on the velocity balance between fuel spray and air flow. As a result, the present inventors found that an effective measure for satisfying the three above-described requirements and to obtain a uniform distribution of fuel is employment of a combustion concept in which a squish area is regarded part of a combustion chamber, and combustion in the squish area—which has been said to be undesirable—is used constructively.

This concept can be realized through determination of the diameter of the piston cavity such that the ratio of the fuel spray velocity at the piston cavity inlet to the velocity of air flow represented by reverse squish flow velocity attains an appropriate value.

That is, the velocity of a reverse squish flow Vs in the vicinity of the compression top dead center and the fuel spray velocity Vsp in the vicinity of the lip portion are estimated from the below-described theoretical formulas, and the diameter of the piston cavity is determined such that the ratio Vs/Vsp becomes 1.25 or less.

It is a further object of the present invention to provide a direct-injection diesel engine wherein a specific power is set to 40 KW/l or higher.

It is a still further object of the present invention to provide a direct-injection diesel engine wherein the ratio of the minimum diameter of an inlet in the piston cavity to the depth of the piston cavity is set to 3.3 or higher, and preferably, 3.5 or higher.

It is a yet further object of the present invention to provide a direct-injection diesel engine wherein the ratio of the minimum diameter of the piston cavity inlet to the bore diameter of the cylinder is set to 0.5 or higher, and preferably, 0.52 or higher.

It is a yet further object of the present invention to provide a direct-injection diesel engine wherein a nozzle hole diameter of the fuel injector is set to 0.2 mm or less, and preferably, about 0.15 mm or less.

According to the present invention, there is provided a direct-injection diesel engine in which a squish area is formed between the top surface of the piston and a cylinder head; and in the vicinity of the compression top dead center, the ratio Vs/Vsp (where Vs is the velocity of a reverse squish flow from the shallow-dish type piston cavity to the squish area generated by a movement of the piston, and Vsp is the fuel spray velocity in the vicinity of a lip portion of the shallow-dish type piston cavity) is set to not greater than 1.25, and the squish area is utilized as a part of the combustion chamber. Thus, the velocity of the fuel spray and the velocity of the reverse flow are well balanced in order to cause the fuel to uniformly disperse within the shallow-dish type piston cavity and the squish area and to combust uniformly, to thereby decrease emission of toxic substances.

Figure 9:
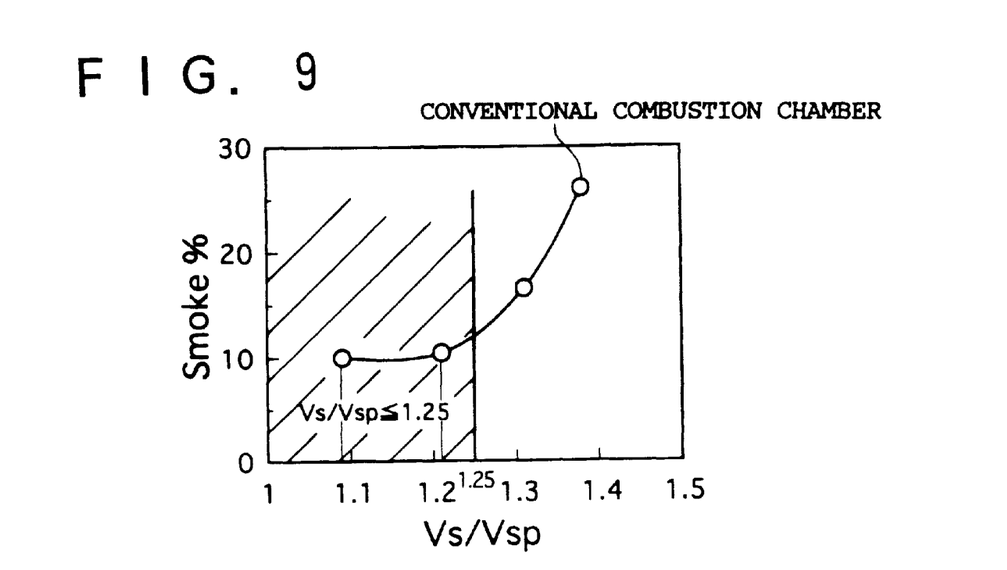
FIG. 9 is a graph showing the results of comparison between diesel engine of the embodiment and a diesel engine of the comparative embodiment in terms of amount of smoke emitted.

That is, as shown in FIG. 9, as the ratio of Vs/Vsp; i.e., the ratio of the velocity Vs of the reverse squish flow to the fuel spray velocity Vsp is decreased, smoke decreases and becomes a low constant value when the ratio Vs/Vsp becomes 1.25 or less. Therefore, the ratio of the velocity Vs of the reverse squish flow to the fuel spray velocity Vsp is set to 1.25 or less.

However, even when the ratio of the velocity Vs of the reverse squish flow and the fuel spray velocity Vsp is 1.32, smoke can be decreased by about 10% that produced with the above-described conventional technique.

In the aspects disclosed in the claims 2, 3, 5 and 7, the velocity of the fuel spray and the velocity of the reverse squish flow are well balanced in order to cause the fuel to uniformly disperse within the shallow-dish type piston cavity and the squish area and to combust uniformly, to thereby decrease emission of toxic substances.

DETAILED DESCRIPTION OF THE PREFERRED EMBODIMENTS

Modes of the present invention will next be described with reference to drawings.
Modes In a direct-injection diesel engine according to a first mode of the present invention, specific power is set to 40 KW/l or higher.

The present mode is directed to a diesel engine for automobiles which is small, is operated at high speed, and has high power output.

There are many kinds of diesel engines such as those for stationary use, those for marine use, those for large trucks, those for automobiles, and small-sized, general-purpose engines. Among them, a diesel engine for automobiles outputs the highest power per unit, displacement (specific output).

A target value for specific output of the present invention 40 KW/l or higher.

Since the first embodiment is directed to such a small, high-speed, high-output diesel engine for automobiles, the ratio Vs/Vsp is set to the above-described value.

In a direct-injection diesel engine according to the second mode, the ratio of the minimum diameter of the piston cavity inlet to the depth of the piston cavity is set to 3.5 or higher.

In a direct-injection diesel engine according to the third mode, the ratio of the minimum diameter of the piston cavity inlet to the bore diameter of the cylinder is set to 0.52 or higher.

In a direct-injection diesel engine according to the fourth mode, a nozzle hole diameter of said fuel injector is set to about 0.15 mm or less.

The diesel engines according to the second, third and fourth modes can greatly reduce emission of toxic substances in order to comply with future strict emission regulation, while providing high power output as described above.

In future diesel engines, the nozzle hole diameter will tend to decrease in order to greatly reduce emission of toxic substances, and can possibly be expected to decrease to about 0.15 mm or less. When the dimensions of a combustion chamber are once determined in consideration of such a small nozzle hole diameter, the ratio Vs/Vsp can be made 1.25 or less through setting of the ratio of the minimum diameter of the piston cavity inlet to the depth of the piston cavity and the ratio of the minimum diameter of the piston cavity inlet to the bore diameter of the cylinder within the above-described ranges.
Embodiments As shown in FIGS. 1 to 6, a direct-injection diesel engine according to the present embodiment comprises a piston 1, a cylinder head 2, and a cylinder liner 3, wherein a shallow-dish type piston cavity 4 is formed on the top surface 10 of the piston 1, and fuel is injected from a fuel injector 5 and combusted in a fuel-air mixture state. A squish area 6 is formed between the top surface 10 of the piston 1 and the cylinder head 2. The diameter (the distance between the opposite wall portions) of the shallow-dish type piston cavity 4 is determined such that in the vicinity of the compression top dead center, the ratio Vs/Vsp (where Vs represents the velocity of a reverse squish flow flowing from the shallow-dish type piston cavity 4 to the squish area 6 due to a movement of the piston 1, and Vsp represents the fuel spray velocity in the vicinity of a lip portion of the shallow-dish type piston cavity 4) is 1.25 or less, and the squish area 6 forms a part of the whole combustion chamber 4.

Figure 1:
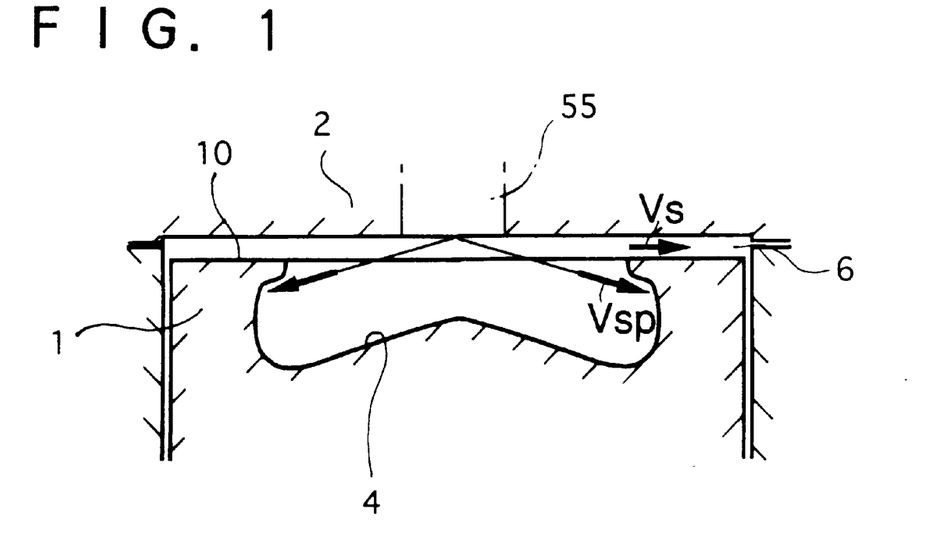
FIG. 1 is a conceptual diagram showing the concept of a reverse squish flow in a direct-injection diesel engine according to the present invention.
Figure 3:
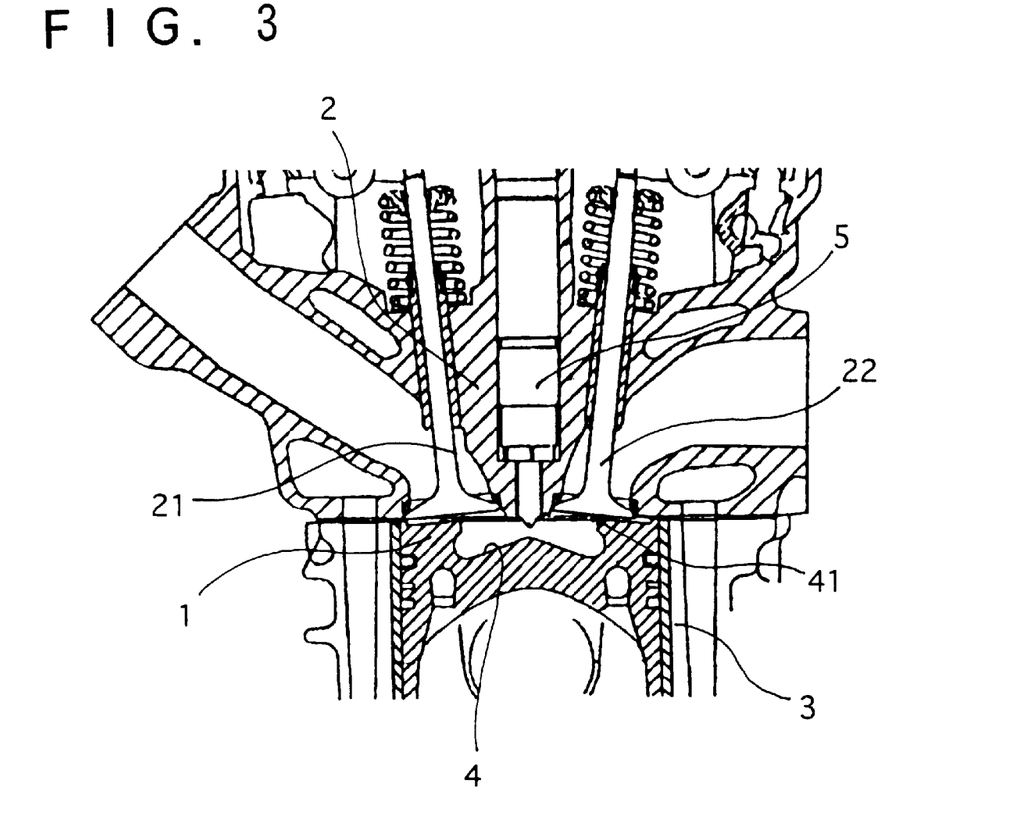
FIG. 3 is a sectional view of the diesel engine according to the present invention.

In the direct-injection diesel engine according to the present embodiment, as shown in FIGS. 1 and 3, the above-described shallow-dish type piston cavity 4 is formed on the top surface 10 of the piston 1, which is reciprocatively received within the cylinder 3 disposed under the cylinder head 2.

An intake valve 21 is obliquely disposed in an intake port of the cylinder head 2 and an exhaust valve 22 is obliquely disposed in an exhaust port of the cylinder head 2 such that the valves 21 and 22 can open and close the intake and exhaust ports. A fuel injector 5 is vertically disposed between the intake valve 21 and the exhaust valve 22 such that a nozzle hole is directed to the shallow-dish type piston cavity 4 formed on the top surface 10 of the piston 1.

There will be described a method for calculating the velocity Vs of the reverse squish flow and the fuel spray velocity Vsp, based on which the diameter (the distance between the opposite wall portions) of the shallow-dish type piston cavity 4 is determined such that the ratio Vs/Vsp; i.e., the ratio of the velocity Vs of the reverse squish flow to the fuel spray velocity Vsp, is 1.25 or less.

First, a representative squish velocity Vs; specifically, a squish velocity at the lip portion, is calculated as described below.

Figure 2:
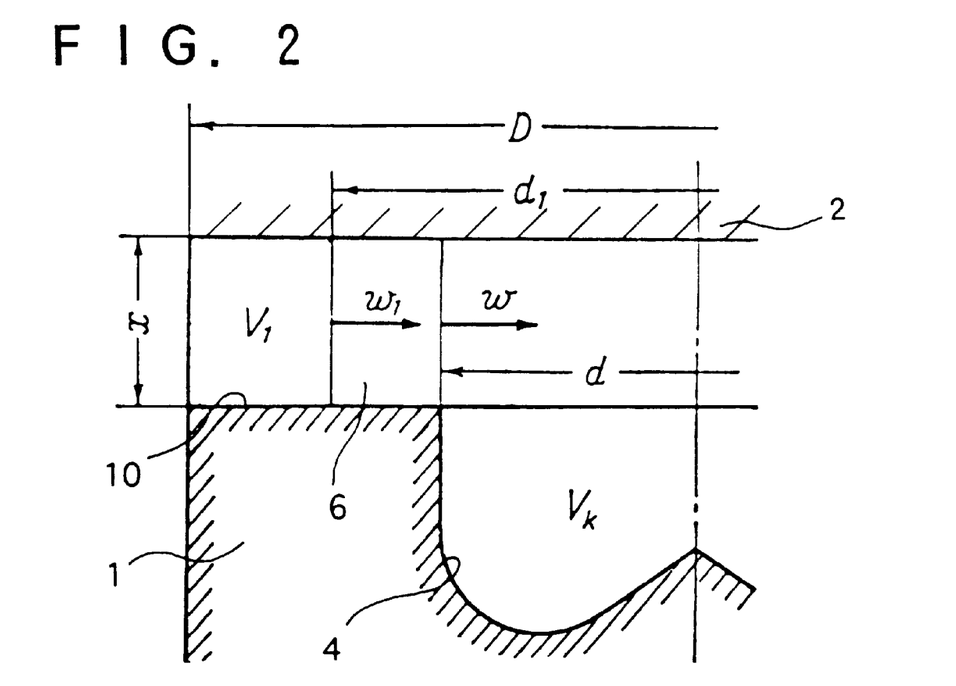
FIG. 2 is an explanatory diagram showing a main portion of the diesel engine according to the present invention and data required for calculation of a squish flow.

That is, the velocity $w_1$ of squish flow at an arbitrary radial position $d_1$ as shown in FIG. 2 is represented by the following equation (1).

$$W_1 = -\frac{D^2 - d_1^2}{4d_1 x} \frac{Vk}{\frac{\pi}{4}D^2 x + Vk} \frac{dx}{dt} \qquad (1)$$

where x is a distance between the lower surface of the cylinder head and the uppermost portion of the top surface of the piston at the crank angle θ; however, the distance includes neither depressed portions of the intake valve 21 and the exhaust valve 22 nor a projected portion of the fuel injector 5, and, further, the uppermost portion of the top surface of the piston does not include locally formed projections.

Vk is the volume of the piston cavity; however, the volume of valve recesses formed on the top surface of the piston is not included. Further, in the case of a piston having a volume between the uppermost surface of the piston and the lip portion (the minimum diameter portion at the piston cavity inlet), the volume on the cylinder-head side with respect to the lip portion and the outer circumferential side with respect to the lip portion is excluded.

D is the diameter of the piston.

d is the diameter of the piston cavity.

Here, dx/dt is represented by the following equation (2).

$$\frac{dx}{dt} = -r\omega\left(\sin\theta + \frac{\rho}{2}\sin 2\theta\right) \qquad (2)$$

where

θ=crank angle r=stroke/2

ω=2π·Ne/60

ρ=r/length of the connecting rod

Ne=rotation speed of the engine

Figure 8:
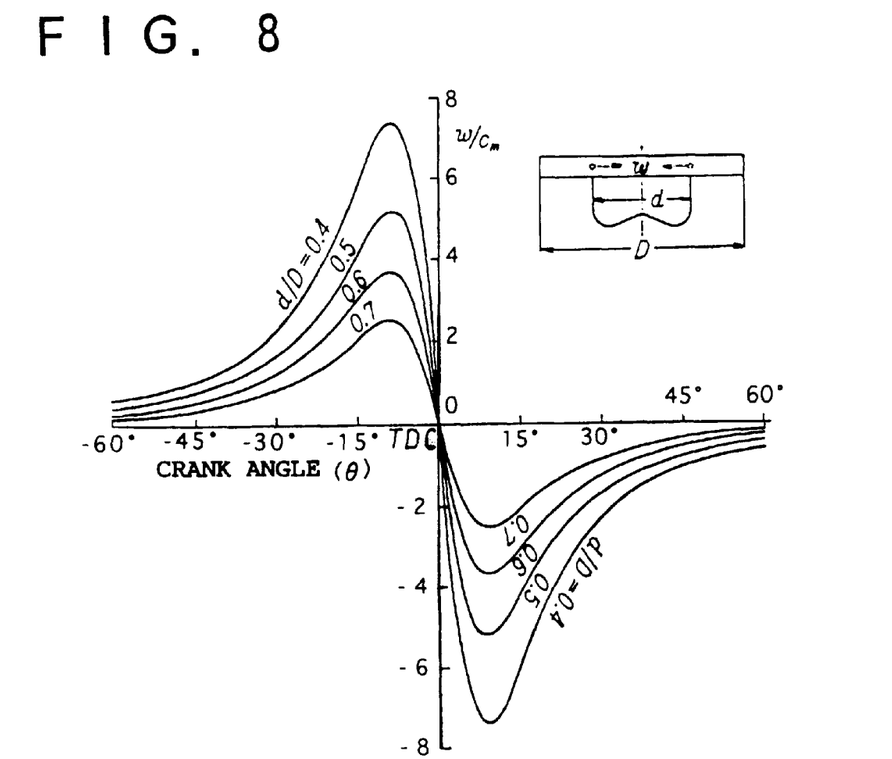
FIG. 8 is a graph showing an example of calculation of the squish and reverse squish flows in the embodiment.

FIG. 8 shows an embodiment in which the change in the squish velocity at $d_1$=d with crank angle is calculated. Since the crank angle corresponding to maximum squish velocity changes with the ratio d/D, the maximum value of the squish velocity is used as the representative squish velocity Vs.

In analytic calculation as in this embodiment, although the sign is opposite, "the velocity of the reverse squish flow" assumes the same absolute value as that of the "the flow velocity of the squish flow," which occurs on the opposite side with respect to the top dead center (crank angle=0). Therefore, the "squish velocity" can be used as a substitute for the "magnitude of the flow velocity."

Next, calculation of a representative fuel spray velocity Vsp will be described.

The representative fuel spray velocity Vsp is calculated on the basis of Hiroyasu's equation, which is a highly reliable empirically-derived relation (source: Proceedings of Society of Automotive Engineers of Japan, No. 21, 1980).

The fuel spray reach distance (penetration) S at time t after start of injection is represented by the following equation (3).

$$S = 2.95\left(\frac{\Delta P}{\rho_a}\right)^{1/4} \sqrt{d_0 \cdot t} \qquad (3)$$

wherein ΔP is the pressure difference between injection pressure and gas pressure.

In the case where a common-rail-type injection apparatus is used and a constant injection pressure is maintained during the injection period, the injection pressure is a common rail pressure. In the case where a jerk-type injection apparatus is used and the pressure varies during the injection period, the maximum injection pressure during the injection period is used as the injection pressure.

A representative gas pressure is a gas pressure inside the cylinder at the start of fuel injection. In the case where fuel is injected, in a divided manner, over a plurality of injection operations, the gas pressure inside the cylinder at the start of fuel injection at a timing closest to the top dead center (injection at a timing where a highest efficiency is obtained) is used as a representative gas pressure.

$\rho_a$ is atmospheric density.

A representative atmospheric density $\rho_a$ is atmospheric density inside the cylinder at the start of fuel injection. In the case where fuel is injected, in a divided manner, over a plurality of injection operations, the atmospheric density inside the cylinder at the start of fuel injection at a timing closest to the top dead center (injection at a timing where a highest efficiency is obtained) is used as a representative atmospheric density.

$d_0$ is the diameter of a nozzle hole.

When the injection nozzle has a function of changing the nozzle hole diameter on the basis of operating conditions of the engine, a nozzle diameter for highest output conditions is used as $d_0$.

Further, when a variable-nozzle-type fuel injector is used and when nozzle holes having different diameters are simultaneously used for highest output conditions, the maximum nozzle hole diameter is used as $d_0$.

Therefore, the fuel spray velocity dS/dt is represented by the following equation (4).

$$\frac{dS}{dt} = 2.95\left(\frac{\Delta P}{\rho_a}\right)^{1/4} \sqrt{d_0}\, \frac{1}{2} t^{-1/2} \qquad (4)$$

The above-described equations (3) and (4) can be represented by the following equation (5), which is a function of the reach distance S.

$$\frac{dS}{dt} = \frac{1}{2}C^2 \frac{1}{S} \qquad (5)$$

where C is represented by the following equation (6).

$$C = 2.95\left(\frac{\Delta P}{\rho_a}\right)^{1/4} \sqrt{d_0} \qquad (6)$$

The representative fuel spray velocity Vsp is calculated in accordance with Equation (5) as the fuel spray velocity dS/dt for the case where the radius of the lip portion is regarded as the fuel spray reach distance (penetration) S.

In this way, the representative reverse squish velocity Vs and the representative fuel spray velocity Vsp are obtained. Subsequently, the diameter is determined such that the ratio of representative squish velocity Vs to representative fuel spray velocity is 1.25 or less.

Since the ratio Vs/Vsp reaches a maximum at maximum output, the relationship Vs/Vsp≦1.25 is always satisfied under all operation conditions if the ratio Vs/Vsp is set to 1.25 or less for maximum output.

The following is a list of data required for determining representative reverse squish velocity Vs and representative fuel spray velocity Vsp.

nozzle hole diameter bore stroke volume of piston cavity lip diameter of piston cavity bore diameter of cylinder engine speed at which a maximum output is obtained injection pressure at which the maximum output is obtained volumetric efficiency at which the maximum output is obtained The present embodiment is directed to a diesel engine for automobiles which is small, is operated at high speed, and has high power output. In the present embodiment, the specific output is set to 40 KW/l or greater.

Figure 4:
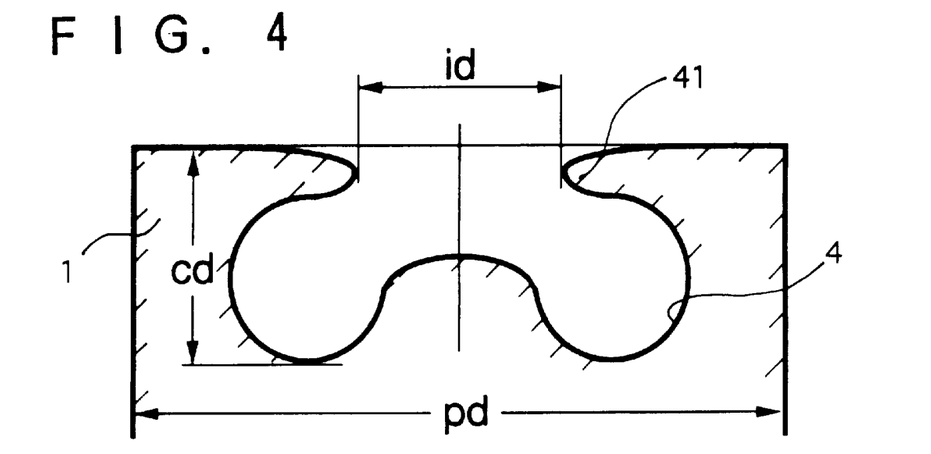
FIG. 4 is an explanatory diagram for describing the minimum diameter of a piston cavity inlet, the depth of the piston cavity, and the diameter of a piston in the present invention.

As shown in FIG. 4, in the direct-injection diesel engine, the ratio of the inlet minimum diameter id of the combustion chamber 4 to the depth cd of the piston cavity 4 is set to 3.3 or higher, preferably to 3.5 or higher, and the ratio of the inlet minimum diameter id of the piston cavity 4 to the bore diameter of the cylinder (≈pd) is set to 0.5 or higher, preferably to 0.52 or higher. In the piston cavity bottom portion having the shape shown in FIG. 4, the ratio id/cd is 3.3 or higher. In the piston cavity bottom portion having the shape shown in FIG. 1 or 3, the ratio id/cd is 3.5 or higher. In the lip portion shown in FIGS. 1, 3, and 4, the ratio id/bore diameter is 0.5 or higher. In the lip portion shown in FIG. 2, the ratio id/bore diameter is 0.52 or higher.

In the direct-injection diesel engine according to the present embodiment having the above-described structure, in the vicinity of the compression top dead center, the ratio Vs/Vsp (where Vs is the velocity of a reverse squish flow from the shallow-dish type piston cavity 4 to the squish area 6 and Vsp is the fuel spray velocity in the vicinity of a lip portion of the shallow-dish type piston cavity 4) is 1.25 or less, wherein the squish area 6 is defined by the top surface 10 of the piston 1 and the surface of the cylinder head opposite the top surface.

Figure 5:
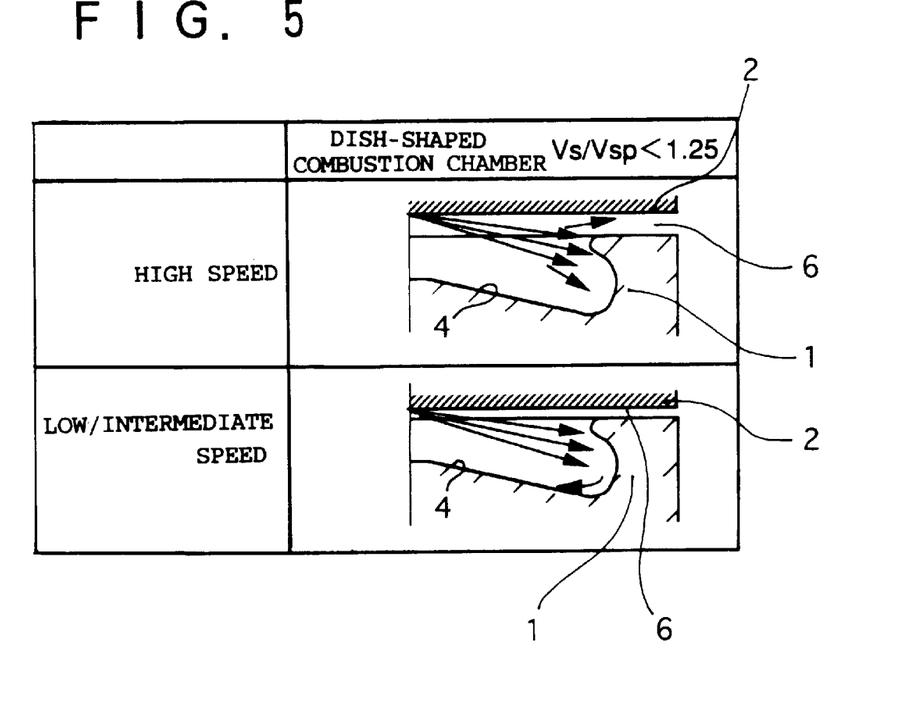
FIG. 5 is an explanatory diagram showing the distribution of fuel spray and fuel vapor within the piston cavity in the present invention for low/intermediate-speed operation and high-speed operation.

FIG. 5 shows the distribution of fuel spray and fuel vapor (i.e., distribution of fuel that is injected from the fuel injector and into the shallow-dish type piston cavity 4 and the squish area 6) in a high-speed operation state and a low/intermediate-speed operation state. That is, in the low/intermediate-speed operation state, the fuel flows along the wall surface of the shallow-dish type piston cavity 4 and does not flow into the squish area 6 very much; however, in the high-speed operation, fuel flows not only into the shallow-dish type piston cavity 4 but also into the squish area 6.

Further, the velocity of the fuel spray and the velocity of the squish flow are well balanced in order to cause the fuel to uniformly disperse within the shallow-dish type piston cavity 4 and the squish area 6 and to combust uniformly. Therefore, the squish area 6 is utilized as a part of the combustion chamber.

In the direct-injection diesel engine of the present embodiment operating in the above-described manner, fuel distributed uniformly within the shallow-dish type piston cavity 4 and the squish area 6 is combusted uniformly. Therefore, exhaust emissions such as smoke and HC can be reduced.

FIG. 9 shows results of comparison between the conventional combustion chamber and the combustion chamber of the present embodiment in terms of emission of smoke for the case where fuel is injected in an amount corresponding to a highest output under full load, under the conditions that the nozzle hole diameter is 0.144 mm, engine speed is 4000 rpm, and volumetric efficiency is 170%, which is realized by use of a reduced nozzle hole diameter, an increased degree of supercharging, and an increased operation speed.

When the above-described conventional combustion chamber is employed, the ratio Vs/Vsp; i.e., the ratio of the velocity Vs of the reverse squish flow to the fuel spray velocity Vsp, is about 1.4, and a large amount of smoke is exhausted. By contrast, when the combustion chamber of the present embodiment is employed, the diameter of the piston cavity is expanded as compared with the conventional combustion chamber such that the ratio of the velocity Vs of the reverse squish flow to the fuel spray velocity Vsp is about 1.25. Therefore, as shown in FIG. 9, the amount of smoke can be decreased considerably.

Figure 6:
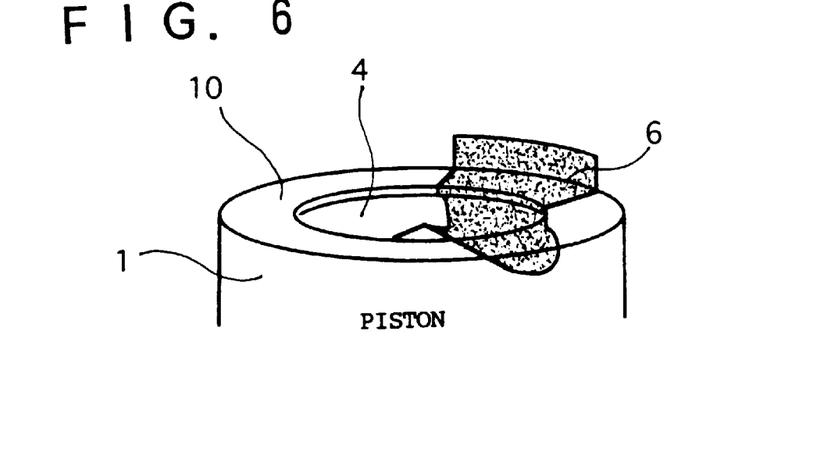
FIG. 6 is an explanatory diagram for explaining a portion of the piston cavity and the squish area where fuel spray is observed in the present invention.

In a comparative embodiment in which the ratio of the velocity Vs of the reverse squish flow to the fuel spray velocity Vsp is set to 1.38, which is greater than 1.25, fuel suffers from repercussion of a strong reverse squish flow at a dotted portion of the combustion chamber and squish area shown in FIG. 6. That is, as shown in the left half of FIG. 7, which shows the distribution of fuel in a combustion chamber to which fuel spray is injected from one of six injection nozzle holes of an injector, the fuel suffers from repercussion of a strong reverse squish flow, and a relatively large portion of the fuel is present outside the piston cavity, so that the fuel distribution becomes nonuniform, and the interior of the piston cavity is not used.

Figure 7:
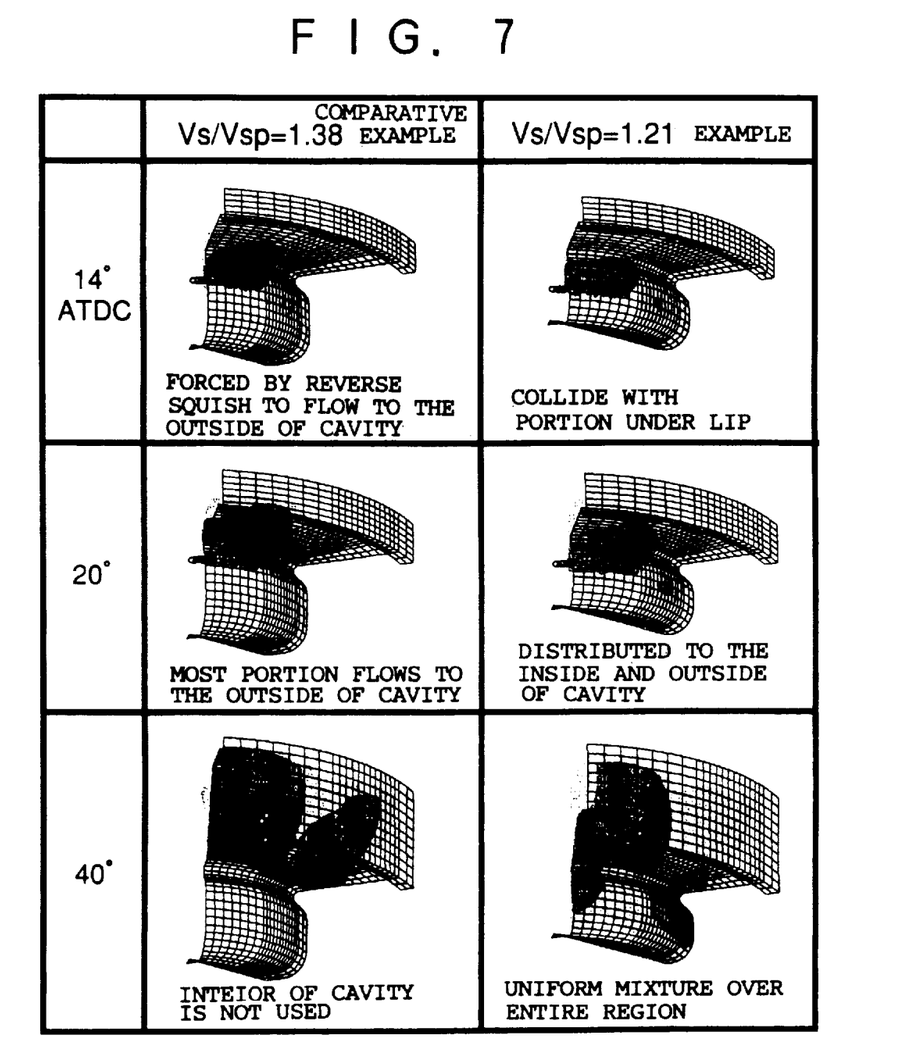
FIG. 7 is a diagram for explaining the fuel distribution in the piston cavity and the squish area of the diesel engine according to the present invention.

In the case of the present embodiment shown in the right half of FIG. 7, in which the ratio of the velocity Vs of the reverse squish flow to the fuel spray velocity Vsp is set to 1.21 or 1.22, which is smaller than 1.25, fuel is distributed uniformly inside and outside the piston cavity and thus uniform mixing is realized over an entire area.

In the case in which the ratio of the velocity Vs of the reverse squish flow to the fuel spray velocity Vsp is set to 1.08 or 1.09, which is smaller than 1.25, fuel is distributed uniformly inside and outside the piston cavity and thus uniform mixing is realized over an entire area, as in the case shown in the right half of FIG. 7.

In the direct-injection diesel engine according to the present embodiment, the specific output is set to 40 KW/l or greater. Therefore, there can be realized a small, high-speed, and high-output diesel engine for automobiles.

Moreover, in the direct-injection diesel engine according to the present embodiment, the ratio of the minimum diameter of the piston cavity inlet to the depth of the piston cavity is set to 3.3 or higher, preferably to 3.5 or higher, and the ratio of the minimum diameter of the piston cavity inlet to the bore diameter of the cylinder is set to 0.5 or higher, preferably to 0.52 or higher. Therefore, an injection nozzle that satisfies the requirement in relation to the ratio Vs/Vsp is a low-emission-type nozzle having a small nozzle hole diameter. Accordingly, the present embodiment provides an effect of simultaneously satisfying both demand for great reduction in exhaust emissions in order to comply with future strict emission regulations and demand for higher specific output.

The preferred modes and embodiments of the present invention, as herein disclosed, are taken as some modes and embodiments for explaining the present invention. It is to be understood that the present invention should not be restricted by these modes, embodiments and any modifications and additions are possible so far as they are not beyond the technical idea or principle based on descriptions of the scope of the patent claims.

What is claimed is:

1. A direct-injection diesel engine comprising:

a combustion chamber defined by a piston, a cylinder head, and a cylinder liner;

a shallow-dish type piston cavity formed on a top surface of said piston;

a squish area defined by said top surface of said piston and said cylinder head in the vicinity of a compression top dead center;

a fuel injector for injecting fuel into said combustion chamber to combust in a fuel-air mixture state; wherein;

a distance between opposite wall surfaces of said shallow-dish type piston cavity is set such that ratio Vs/Vsp is not greater than 1.25, in order to use said squish area effectively as a part of said combustion chamber by dispersing and burning a fuel uniformly within said shallow-dish type piston cavity and said squish area; where:

Vs is a velocity of the reverse squish flow flowing from said shallow-dish type piston cavity to said squish area due to a movement of said piston; and Vsp is a fuel spray velocity in the vicinity of a lip portion of said shallow-dish type piston cavity.

2. A direct-injection diesel engine according to claim 1, wherein a specific power is set to 40 KW/l or higher.

3. A direct-injection diesel engine according to claim 1, wherein a ratio of a minimum diameter of an inlet of the shallow-dish type piston cavity to a depth of the shallow-dish type piston cavity is set to 3.3 or higher.

4. A direct-injection diesel engine according to claim 1, wherein a ratio of a minimum diameter of an inlet of the shallow-dish type piston cavity to a depth of the shallow-dish type piston cavity is set to 3.5 or higher.

5. A direct-injection diesel engine according to claim 1, wherein a ratio of a minimum diameter of the shallow-dish type piston cavity inlet to a bore diameter of the cylinder is set to 0.5 or higher.

6. A direct-injection diesel engine according to claim 1, wherein a ratio of a minimum diameter of the shallow-dish type piston cavity inlet to a bore diameter of the cylinder is set to 0.52 or higher.

7. A direct-injection diesel engine according to claim 1, wherein a nozzle hole diameter of said fuel injector is set to 0.2 mm or less.

8. A direct-injection diesel engine according to claim 1, wherein a nozzle hole diameter of said fuel injector is set to 0.15 mm or less.

9. A direct-injection diesel engine according to claim 1, wherein the squish velocity Vs is a maximum value of the squish velocity.

10. A direct-injection diesel engine according to claim 1, wherein the fuel spray velocity Vsp is calculated as a fuel spray velocity for a case where a radius of the lip portion is regarded as the fuel spray reach distance S.

11. A direct-injection diesel engine according to claim 1, wherein the ratio Vs/Vsp is a value which is obtained at a maximum output.

12. A direct-injection diesel engine according to claim 1, wherein said lip portion of said shallow-dish type piston cavity comprises a small lip formed by the difference of maximum diameter and minimum diameter of said shallow-dish type piston cavity in order to cause the reverse squish flow from said shallow-dish type piston to said squish area.

* * * * *